June 7, 1949.　　　　K. FARLEY　　　　2,472,068
EXPANSIBLE CORE FOR USE IN MOLDING
HOLLOW CONCRETE WALLS Filed May 22, 1946　　　　　　　　　3 Sheets-Sheet 2

INVENTOR.
Kathryn Farley
BY
Attorney

June 7, 1949.                    K. FARLEY                    2,472,068
                EXPANSIBLE CORE FOR USE IN MOLDING
                       HOLLOW CONCRETE WALLS
Filed May 22, 1946                                      3 Sheets-Sheet 3

INVENTOR.
Kathryn Farley
BY
Attorney

Patented June 7, 1949

2,472,068

UNITED STATES PATENT OFFICE 2,472,068

EXPANSIBLE CORE FOR USE IN MOLDING HOLLOW CONCRETE WALLS

Kathryn Farley, Chicago, Ill.

Application May 22, 1946, Serial No. 671,615

8 Claims. (Cl. 25—128)

1

My invention relates to molding forms and especially to a collapsible type of molding form, or core, which may be used in connection with the construction of cement or other similar self-setting walls; the wall itself being preferably cast and confined between forms made up of lumber or other similar material, while the cores are positioned therein prior to the pouring of the cement or concrete.

A further object of my invention is to provide a form which can be quickly and easily expanded or contracted and which is made up of comparatively light elemental sections, yet amply strong to withstand the strain of the heavy work for which it is to be used.

A further object is to construct a molding form, or core, from relatively few and simple elemental parts, the various parts being so interconnected that the entire core remains intact as a unitary structure, and can be readily expanded and contracted.

A further object of my invention is to provide a core, or molding form, of the afore-mentioned character which when expanded assumes a continuous perimetral line which is responsible for the production of a smooth, uniform opening throughout.

A further object of my invention is to provide a molding form, or core, of the afore-mentioned character which is manipulated by a handle structure for effectuating the collapsing or expansion thereof, by the mere rotation of the said manipulating handle through an arcuate movement of approximately 90°.

With the above objects in view, the invention consists of the arrangement and construction of parts hereinafter more particularly described as well as their relationship and assemblage being indicated, reference being had to the accompanying drawings, in which.

2 recesses, or cores, or pockets, therein made by the molding form constituting my invention.

Figure 2:
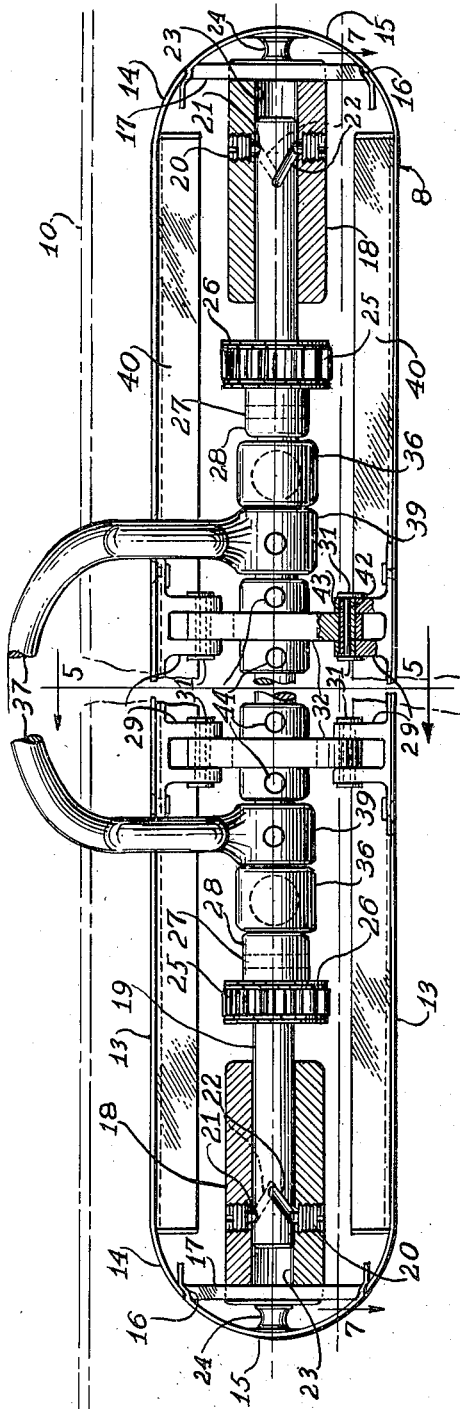
Figure 2 is an enlarged top view of my invention showing the same in expanded position preparatory to pouring the cementitious composition, or concrete, for forming a cored wall structure.
Figure 5:
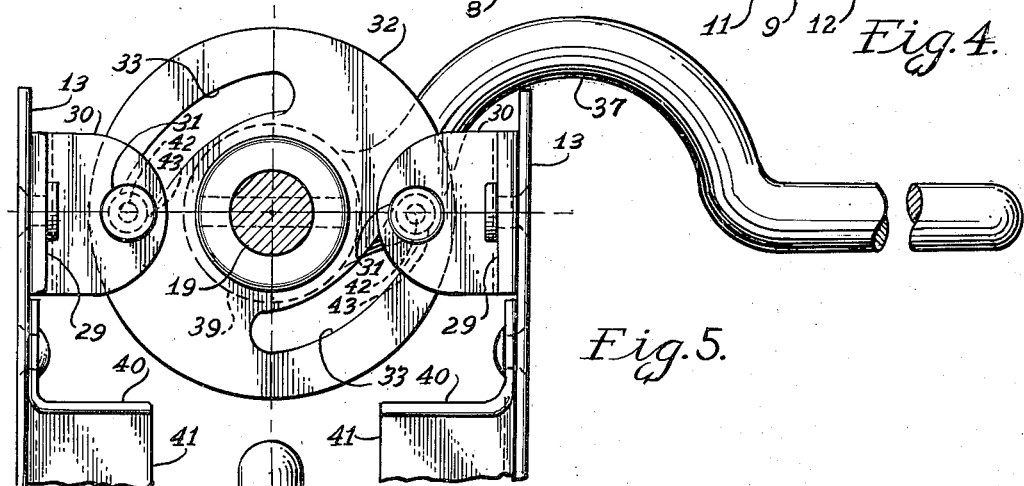

Figure 5 is a cross-sectional view taken, substantially, on the line 5—5 of Figure 2.

Figure 3:
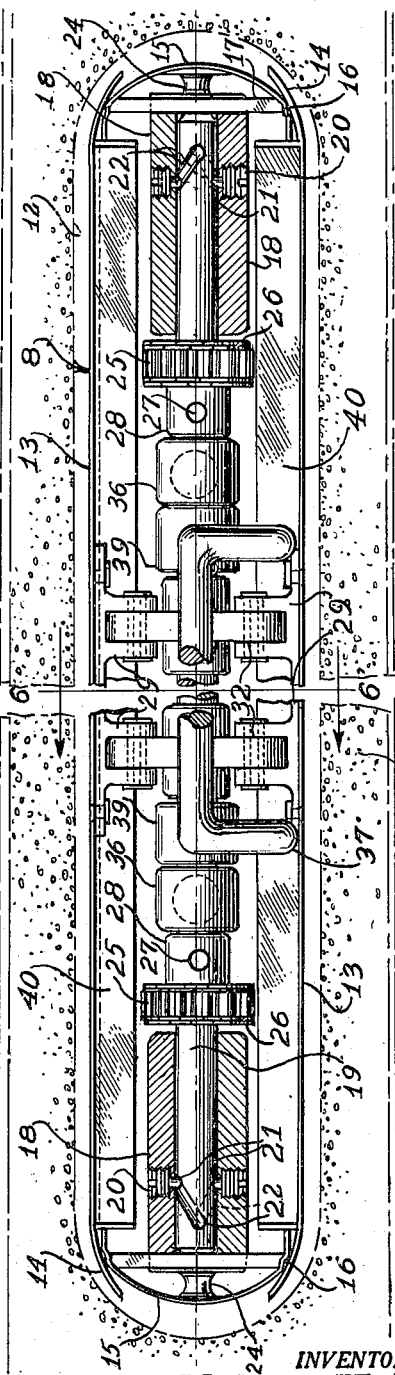
Figure 3 is a view similar to Figure 2 showing the core or molding form in collapsed position, preparatory to withdrawal from the opening formed thereby in a wall structure.
Figure 6:
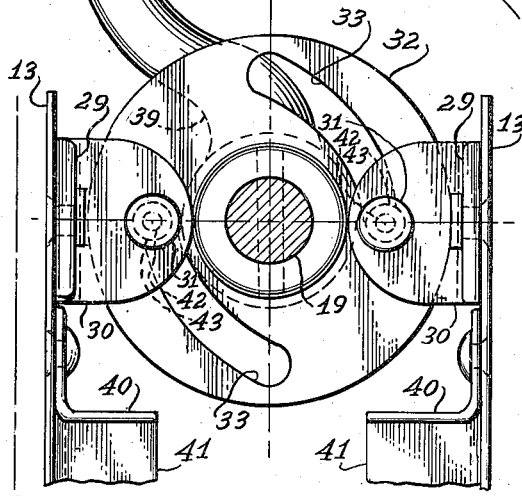

Figure 6 is a cross-sectional view taken, substantially, on the line 6—6 of Figure 3.

Figure 7:
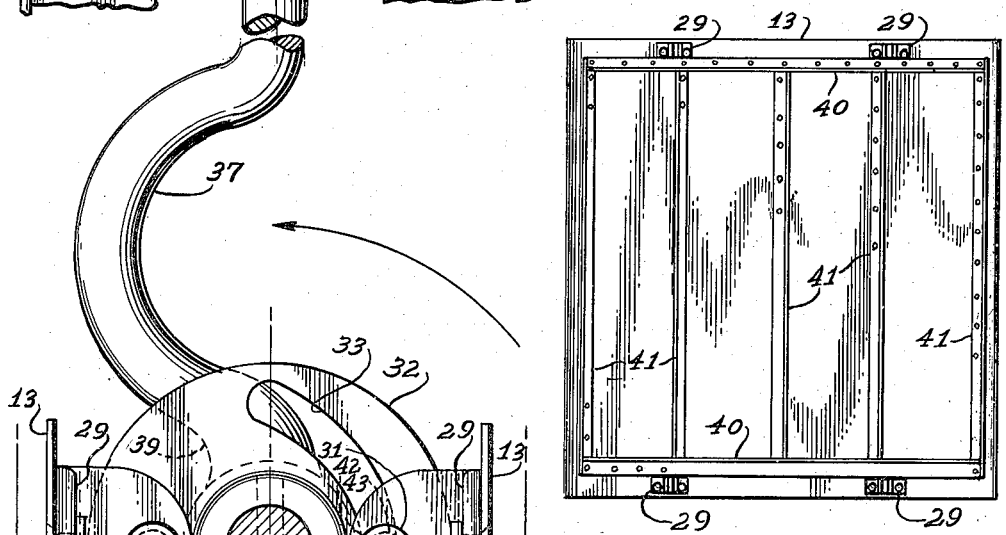

Figure 7 is a cross-sectional view taken, substantially, on the line 7—7 of Figure 2.

Referring to the various figures, my invention is generally designated 8, and consists of the sides, or side plates, 13 which are of suitable straight formation throughout, yet have their edges arcuately shaped as indicated at 14, presenting edges which will function and cooperate in nesting relationship with the indentations 16 provided in the arcuate end elements 15, so that when the molding form is expanded the edges of the plates 13 will form a continuous nesting arrangement with the indentations 16 of the curved end plates 15 as illustrated in Figure 2.

The purpose of these molding forms or cores 8 is to prevent concrete from filling the perimetral space occupied thereby, thus leaving openings 12 in a concrete wall 9. The said wall is usually poured from concrete after proper admixture thereof, and confined by wall formations 10 and 11 usually made up of boards, lumber, or other suitable material which can be readily dismantled after the wall has set and hardened.

Figure 1:
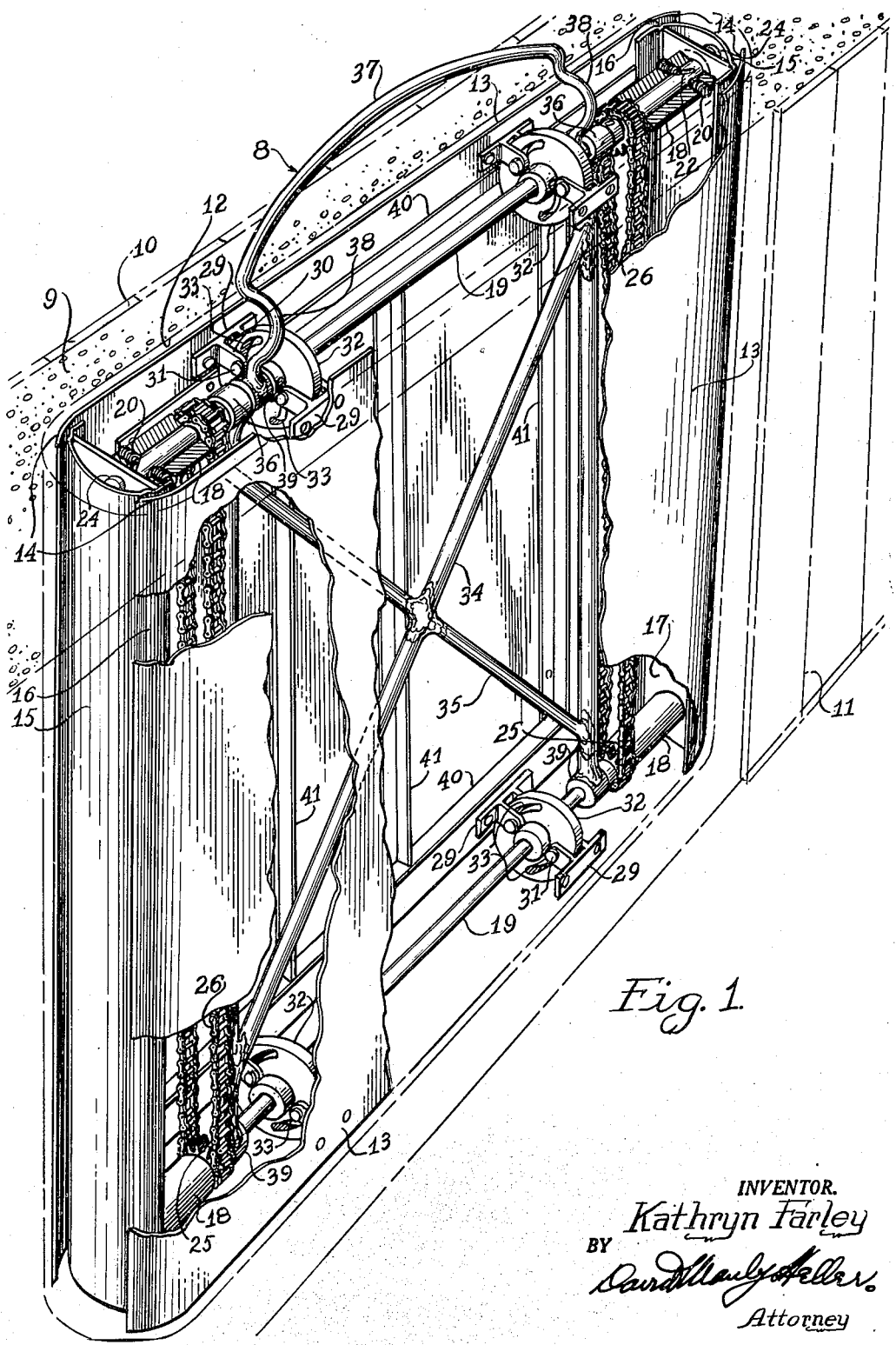
Figure 1 is a perspective view of my invention showing the same in collapsed or in contracted position preparatory to withdrawing the same from a wall structure, in which it had been originally positioned.

The mechanism for effectuating the collapsing and expansion of the core generally designated 8 consists in a shaft 19, and a mating shaft 19 therebelow, one being located at the top and one at the bottom of the molding form. At the termini of each shaft unit 19, I provide the cam slots 22 which are engaged by the screw means 20, having the reduced shanks 21, the said screws being secured to the hub 18, permitting the said shanks 21 to function within the cam grooves 22 when the shafts 19 are rotated toward the observer (looking at Figure 1), and when rotated away from the observer will actuate the end sections 15 outwardly, thus expanding the core or molding form. Hence, when the handle is operated toward the observer an arcuate distance of 90°, or in an upward direction, to bring it to erect, or perpendicular position, the molding form is collapsed as shown in Figure 1. The hubs 18 emanate from the reinforcement plates 17 secured within the arcuate sections 15, and are equipped with bores 23 which house the termini of the shafts 19.

On the shaft 19, I also secure discs 32 which are provided with arcuately formed companion cam slots 33, which are engaged by the rollers 43, secured in place by the studs 42 fastened in the lugs 30 of the bearings 29, the bearings being in turn secured to the end plates 13. The actuation, or rotation, of the plates 32 occurs simultaneously with the rotation of the shafts 19 inasmuch as the said discs are secured to the shafts by pins or other similar fastenings 44. The studs 31 are riveted to form heads 42 and may have tubular rollers 43 mounted thereon to facilitate operation. The handle 37 has an arcuate top portion, and the perpendicular extensions thereof are slightly arched as indicated at 38, in order to furnish clearance for the upper edges of the side plates 13, permitting the handle 37 to be motivated, or rotated, through an arcuate distance of 90 degrees, providing clearance for the top edges of the plates 13. The handle 37 is provided with two hubs 39, so that the same may be secured to the shaft 19 by means of pins or other similar fastenings, such as set screws, or any other suitable fastening may be employed. In order to obtain a neat and free action of the plates 13 inwardly, and outwardly, as well as of the end elements 15 inwardly and outwardly, the second shaft 19 is located, substantially, near the bottom of the structure, and is a companion arrangement, or combination of elements similar to that shown up at the top, the two being interconnected to operate in unison by means of the sprockets 25 being interconnected by the chain 26, thus a relatively free expansion and collapsing movement is effectuated for the core or molding form. The sprockets are equipped with hubs 27 which are attached to the shafts 19 by means of pins 28.

The entire unit is reinforced by the spider structure 34, 35 having bearing extension 36, two of which are secured to the upper shaft 19, and two of which are secured to the lower shaft, thus lending rigidity to the mechanism internally of the core molding form, so that when the two shafts are actuated in unison as heretofore mentioned, no undue strain will hamper the free movement of the plates 13 inwardly and outwardly, nor of the end sections 15.

It is to be noted that an important feature of my invention is the provision on the side plates 13 of arcuately and inwardly formed portions 14, the edges of which nest within the indentations 16 which are of a depth not to exceed the thickness of the plates 13, so that a continuous perimetral oval shape will result when the same is expanded. The plates 13 are also reinforced by suitable angle or channel iron structure 40 and 41 in order to strengthen the same to withstand the pressure during the pouring of the concrete. It is to be noted, that the horizontal reinforcement 40 also acts as a stop or abutment limiting the movement of the end sections 15 as evidenced by reference to the drawings of Figure 2 and Figure 3.

In pouring a concrete wall the operation is rather simple. The wall thickness is usually formed by the demarcation and the distance between the temporary pouring walls 10 and 11. The cores therein will usually result from the placement of a number of molding forms 8, preferably, in the staggered relationship indicated in Figure 4, so as not to interfere with the strength of the wall section. The core forms, or molding forms, are handled by securing a crane, or other lifting or lowering instrumentality, securing hooks thereof to the supports 24, thus lowering the cores in between the walls 10 and 11, approximately in the position shown in Figure 4, and in the expanded formation indicated in Figure 2. After the wall has been poured, and has set not quite completely, that is, without hardening, the hooks of the instrumentality used for placing the cores in position are attached to the central bowed portion of the handle 37 and the cores are lifted. In the lifting operation, as will be noted, the initial action would be to lift the handle and rotate the same a distance of 90°, before actual lifting of the bottom of the molding form will take place, thus collapsing of the core is assured prior to its removal from the resting position. In this way a smooth pocket or core 12 will be formed within the walls as illustrated in Figure 4.

Figure 4:
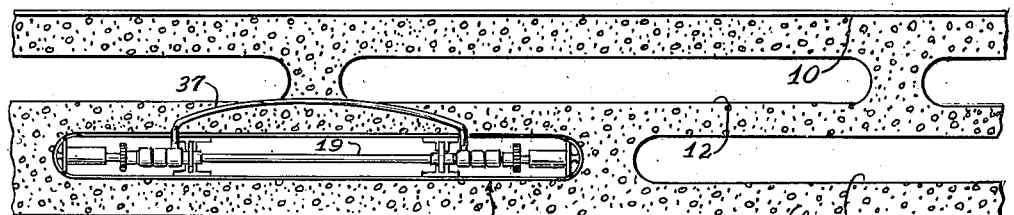
Figure 4 is a top view of a type of wall having

All the forms are thus removed, and when the wall has sufficiently set to stand up and be rigid, then the wall formations 10 and 11 are removed and the operation repeated for the remaining walls, or it may be that a series of walls may be poured simultaneously, depending on the location, shape and manner in which the confining walls 10 and 11 are positioned, suitable cores 12 being formed within these walls simultaneously, if a sufficient number of cores are placed therein in staggered position as indicated in Figure 4. Thus, it can be seen that the movement of the handle 37 a distance of 90° will simultaneously actuate the end plates a certain distance inwardly or outwardly depending on the direction of movement, and simultaneously will effectuate a movement of the plates 13 toward or away from one another.

The cam grooves 22 may be so disposed and timed with reference to the cam grooves 33 that there will be a tendency to move the end sections 15 inwardly a slight distance before actuation of the side plates 13 actually takes place. In other words, the movement inwardly of the side plates 13 will be slightly delayed, in order to assure a smooth operation, and conversely when the end sections 15 have completed their travel the side plates 13 will be caused to have their edges engaged firmly in the longitudinal indentations 16 thus locking securely the entire molding form in order to permit the formation of a smooth lined pocket free of irregularity.

I believe, I have herein described, rather succinctly, the construction and operation of my invention, and inasmuch as the same is susceptible of modifications, alterations and improvements, I hereby reserve the right to all modifications, alterations and improvements coming within the scope and spirit of my invention, as well as any improvements that are embraced in the accompanying drawings, and any that may fall within the purview of the foregoing description.

Having thus described and disclosed my invention, what I claim as novel, and desire to secure by Letters Patent, is:

1. In a molding form of the character described including side plates and end sections, expanding and contracting means comprising, cam shafts provided with cam grooves and rotatably secured to hubs of the said end sections, shoulder screws secured to the said hubs their extensions engaging the said cam grooves in the said cam shafts, cam discs secured to the said cam shafts, roller brackets secured to the said side plates and engaging the said cam discs, transmission means interconnecting the said cam shafts, and rotatable manipulative means secured to one of the said cam shafts.

2. In a molding form of the character described including side plates and end sections, expanding and contracting means comprising, cam shafts provided with cam grooves and rotatably secured to hubs of the said end sections, shoulder screws secured to the said hubs their extensions engaging the said cam grooves in the said cam shafts, cam discs secured to the said cam shafts, roller brackets secured to the said side plates and engaging the said cam discs, transmission means interconnecting the said cam shafts, and rotatable manipulative means secured to one of the said cam shafts, the said manipulative means operative within an orbit of 90° to effectuate contraction and expansion of the said molding form.

3. In a molding form of the character described including side plates and end sections, expanding and contracting means comprising, cam shafts provided with cam grooves and rotatably secured to hubs of the said end sections, shoulder screws secured to the said hubs their extensions engaging the said cam grooves in the said cam shafts, cam discs secured to the said cam shafts, roller brackets secured to the said side plates and engaging the said cam discs, transmission means interconnecting the said cam shafts, and rotatable manipulative means secured to one of the said cam shafts, the said manipulative means operative within an orbit of 90° to effectuate contraction and expansion of the said molding form, the said manipulative means provided with bowed out portions to clear the upper edges of the said side plates.

4. A molding form comprising, two side plates having arcuately-shaped longitudinal edges formed inwardly, a pair of arcuately-formed end sections provided with longitudinal indentations near the edges thereof, the said longitudinal edges adapted to engage the said longitudinal indentations providing a continuous perimetral configuration when the said molding form is in extended position, expanding and contracting means secured internally at the top and bottom of said molding form adapted to expand and contract the said side plates and end sections, and rotatable manipulative means secured to the said expanding and contracting means, the said expanding and contracting means comprising, cam shafts provided with cam grooves and rotatably secured to hubs of the said end sections, shoulder screws secured to the said hubs their extensions engaging the said cam grooves in the said cam shafts, cam discs secured to the said cam shafts, roller brackets secured to the said side plates and engaging the said cam discs, transmission means interconnecting the said cam shafts, and rotatable manipulative means secured to one of the said cam shafts.

5. A molding form comprising, two side plates having arcuately-shaped longitudinal edges formed inwardly, a pair of arcuately-formed end sections provided with longitudinal indentations near the edges thereof, the said longitudinal edges adapted to engage the said longitudinal indentations providing a continuous perimetral configuration when the said molding form is in extended position, expanding and contracting means secured internally at the top and bottom of said molding form adapted to expand and contract the said side plates and end sections, and abutment means secured adjacent the top and bottom of the said side plates to arrest the edges of the said end sections during the inward movement thereof, the said expanding and contracting means comprising, cam shafts provided with cam grooves and rotatably secured to hubs of the said end sections, shoulder screws secured to the said hubs their extensions engaging the said cam grooves in the said cam shafts, cam discs secured to the said cam shafts, roller brackets secured to the said side plates and engaging the said cam discs, transmission means interconnecting the said cam shafts, and rotatable manipulative means secured to one of the said cam shafts.

6. A molding form comprising, two side plates having arcuately-shaped longitudinal edges formed inwardly, a pair of arcuately-formed end sections provided with longitudinal indentations near the edges thereof, the said longitudinal edges adapted to engage the said longitudinal indentations providing a continuous perimetral configuration when the said molding form is in extended position, expanding and contracting means secured internally at the top and bottom of said molding form adapted to expand and contract the said side plates and end sections, the said expanding and contracting means comprising, cam shafts provided with cam grooves and rotatably secured to hubs of the said end sections, shoulder screws secured to the said hubs their extensions engaging the said cam grooves in the said cam shafts, cam discs secured to the said cam shafts, roller brackets secured to the said side plates and engaging the said cam discs, transmission means interconnecting the said cam shafts, rotatable manipulative means secured to one of the said cam shafts and supports secured to the said end sections for handling the said molding form in expanded formation.

7. A molding form comprising, two side plates having arcuately-shaped longitudinal edges formed inwardly, a pair of arcuately-formed end sections provided with longitudinal indentations near the edges thereof, the said longitudinal edges adapted to engage the said longitudinal indentations providing a continuous perimetral configuration when the said molding form is in extended position, expanding and contracting means secured internally at the top and bottom of said molding form adapted to expand and contract the said side plates and end sections, and abutment means secured adjacent the top and bottom of the said side plates to arrest the edges of the said end sections during the inward movement thereof, the said expanding and contracting means comprising, cam shafts provided with cam grooves and rotatably secured to hubs of the said end sections, shoulder screws secured to the said hubs their extensions engaging the said cam grooves in the said cam shafts, cam discs secured to the said cam shafts, roller brackets secured to the said side plates and engaging the said cam discs, transmission means interconnecting the said cam shafts, and rotatable manipulative means secured to one of the said cam shafts, and supports secured to the said end sections for handling the said molding form in expanded formation.

8. A molding form comprising, two side plates having arcuately-shaped longitudinal edges formed inwardly, a pair of arcuately-formed end sections provided with longitudinal indentations near the edges thereof, the said longitudinal edges adapted to engage the said longitudinal indentations provided a continuous perimetral configuration when the said molding form is in extended position, expanding and contracting means secured internally at the top and bottom of said molding form adapted to expand and contract the said side plates and end sections, and abutment means secured adjacent the top and bottom of the said side plates to arrest the edges of the said end sections during the inward movement thereof, the said expanding and contracting means comprising, cam shafts provided with cam grooves and rotatably secured to hubs of the said end sections, shoulder screws secured to the said hubs their extensions engaging the said cam grooves in the said cam shafts, cam discs secured to the said cam shafts, roller brackets secured to the said side plates and engaging the said cam discs, transmission means interconnecting the said cam shafts, and rotatable manipulative means secured to one of the said cam shafts, and supports secured to the said end sections for handling the said molding form in expanded formation, the said manipulative means being rotatable initially through an angle of 90° prior to actual raising of the said molding form assuring complete contraction to facilitate removal of the said molding form from a core.

KATHRYN FARLEY.

REFERENCES CITED

The following references are of record in the file of this patent:

UNITED STATES PATENTS

| Number | Name | Date |
|---|---|---|
| 1,242,092 | Wazbinski | Oct. 2, 1917 |
| 2,138,693 | Corwin | Nov. 29, 1938 |